(12) United States Patent
Smirnov

(10) Patent No.: US 8,963,401 B2
(45) Date of Patent: Feb. 24, 2015

(54) VIBRATION ACTUATOR

(75) Inventor: Viatcheslav Smirnov, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 267 days.

(21) Appl. No.: 13/616,724

(22) Filed: Sep. 14, 2012

(65) Prior Publication Data

US 2014/0028153 A1    Jan. 30, 2014

(30) Foreign Application Priority Data

Jul. 27, 2012   (KR) .................. 10-2012-0082401

(51) Int. Cl.
*H02N 2/00* (2006.01)
*G01L 23/10* (2006.01)
*G01L 1/16* (2006.01)

(52) U.S. Cl.
CPC .. *G01L 23/10* (2013.01); *G01L 1/16* (2013.01)
USPC ............ 310/324; 310/328; 310/329; 310/338

(58) Field of Classification Search
CPC ........... G01L 23/10; G01L 1/16; H04R 17/00
USPC ............... 310/324, 327, 328, 329, 338
See application file for complete search history.

(56) References Cited

U.S. PATENT DOCUMENTS

| | | | |
|---|---|---|---|
| 8,016,573 B2 * | 9/2011 | Kitahara et al. | 417/413.1 |
| 2005/0093398 A1 * | 5/2005 | Kim et al. | 310/324 |
| 2006/0232167 A1 * | 10/2006 | Jordan | 310/324 |
| 2012/0140414 A1 | 6/2012 | Ishikawa et al. | |

FOREIGN PATENT DOCUMENTS

| | | |
|---|---|---|
| KR | 10-2006-0000894 | 1/2006 |
| KR | 10-0639024 | 10/2006 |
| KR | 10-2008-0007438 | 1/2008 |

OTHER PUBLICATIONS

Korean Office Action issued May 20, 2013 in corresponding Korean Patent Application No. 10-2012-0082401.

* cited by examiner

*Primary Examiner* — Derek Rosenau
*Assistant Examiner* — Bryan Gordon

(57) ABSTRACT

There is provided a vibration actuator including: a housing providing an internal space and including holes formed to allow the internal space to be in communication with the outside; a diaphragm disposed to separate the internal space into first and second chambers; a mass body coupled to the diaphragm; and a piezoelectric element coupled to one inner surface of the housing and disposed under the mass body.

32 Claims, 19 Drawing Sheets

VIBRATION ACTUATOR

CROSS-REFERENCE TO RELATED APPLICATIONS

This application claims the priority of Korean Patent Application No. 10-2012-0082401 filed on Jul. 27, 2012, in the Korean Intellectual Property Office, the disclosure of which is incorporated herein by reference.

BACKGROUND OF THE INVENTION

1. Field of the Invention

The present invention relates to a vibration actuator, and more particularly, to a vibration actuator using a piezoelectric element.

2. Description of the Related Art

Recently, as personal digital assistants having large liquid crystal display (LCD) screens provided for user convenience have been released onto the market, a touch screen scheme has been adopted therein, and a vibration motor for generating vibrations at the time of a touch has been used therewith.

A vibration motor, a component converting electrical energy into mechanical vibrations using the principle of generating electromagnetic force, is mounted in a personal digital assistant to thereby be used for silently notifying a user of call reception by transferring vibrations thereto.

According to the related art, a brush type structure using a commutator or a scheme of periodically generating electromagnetic force according to a resonant frequency to generate vibrations has been used.

However, in the brush type structure using the commutator, since a brush passes through a clearance between segments of the commutator at the time of motor rotation, mechanical friction and electrical sparks may be caused and foreign objects may be generated, such that a lifespan of a motor may be reduced. In addition, since a certain amount of time is required to arrive at a target vibration amount due to rotational inertia at the time of the application of voltage to the motor, there are limitations in implementing vibrations appropriate for a touch screen.

In addition, in the case of a linear vibrator, contact between components vibrating in an internal space and noise therefrom may be generated, such that performance and characteristics of the vibrator are changed, effecting the performance of a portable electronic device using the linear vibrator.

Therefore, research into a vibration actuator that may be slimmed in accordance with the market trend for miniaturization and slimness in portable electronic devices, may be efficiently produced, and does not have a negative effect on performance and characteristics of a vibrator even in the case in which several factors act has been undertaken.

The following Related Art Document (Patent Document) discloses a vibration generator generating vibrations using a piezoelectric element.

RELATED ART DOCUMENT (Patent Document 1) Korean Patent No. 0639024

SUMMARY OF THE INVENTION

An aspect of the present invention provides a vibration actuator capable of satisfying demand for miniaturization and slimness in portable electronic devices, increasing a vibration amount, and decreasing power consumption.

Another aspect of the present invention provides a vibration actuator including a cooling system capable of cooling heat generated in a process of driving the vibration actuator.

According to an aspect of the present invention, there is provided a vibration actuator including: a housing providing an internal space and including holes formed to allow the internal space to be in communication with the outside; a diaphragm disposed to separate the internal space into first and second chambers; a mass body coupled to the diaphragm; and a piezoelectric element coupled to one inner surface of the housing and disposed under the mass body.

The mass body may be disposed in the second chamber.

The holes may be formed in the housing such that each of the first and second chambers is in communication with ambient air surrounding the housing.

The diaphragm may include at least one bent portion formed in one surface thereof and having a hemispherical shape.

The diaphragm may have elastic force.

In the piezoelectric element, a single piezoelectric film may be used.

In the piezoelectric element, a plurality of piezoelectric films may be used.

One inner surface of the housing may be provided with an outer wall protruding to correspond to an outer diameter of the piezoelectric element.

The mass body may include a protrusion portion formed by protruding at least a portion of an upper surface thereof upwardly, the protrusion portion being coupled to the diaphragm.

The vibration actuator may further include a support portion disposed between the housing and the diaphragm and elastically supporting the mass body coupled to the diaphragm.

The vibration actuator may further include a first elastic member disposed between the piezoelectric element and the mass body, wherein the piezoelectric element may be disposed to be spaced apart from the mass body by a predetermined interval.

The vibration actuator may further include a support portion disposed between the housing and the diaphragm and elastically supporting the mass body coupled to the diaphragm.

According to another aspect of the present invention, there is provided a vibration actuator including: a housing providing an internal space and including holes formed to allow the internal space to be in communication with the outside; a piezoelectric element coupled to one inner surface of the housing; a mass body disposed on an upper portion of the piezoelectric element; and a diaphragm having one end coupled to the mass body and the other end coupled to the housing to separate the internal space into first and second chambers together with the mass body.

The mass body may include a horizontal portion, a protrusion portion protruding upwardly from a central portion of the horizontal portion, and an avoidance portion extended downwardly from an outer side of the horizontal portion.

The diaphragm may have one end coupled to the horizontal portion.

One inner surface of the housing may be provided with an outer wall protruding to correspond to an outer diameter of the piezoelectric element.

The other inner surface of the housing may be provided with a projection portion protruding to have an inner diameter larger than an outer diameter of the protrusion portion.

The mass body may include a horizontal portion, a protrusion portion protruding upwardly from a central portion of the horizontal portion, an avoidance portion extended downwardly from an outer side of the horizontal portion, a seat portion extended from the avoidance portion in an outer radial direction, and an extension portion extended downwardly from the seat portion The diaphragm may have one end coupled to the seat portion.

The vibration actuator may further include a second elastic member having one end coupled to the housing and the other end coupled to the seat portion to elastically support the mass body.

The vibration actuator may further include a second elastic member having one end coupled to the housing and the other end coupled to the protrusion portion to elastically support the mass body.

The mass body may include a horizontal portion, a vertical portion extended from an outer side of the horizontal portion in a vertical direction, and a seat portion formed to be bent from a lower portion of the vertical portion in an outer radial direction.

The diaphragm may have one end coupled to the seat portion.

The vibration actuator may further include a support portion disposed between the housing and the horizontal portion and elastically supporting the mass body.

The vibration actuator may further include a second elastic member having one end coupled to the housing and the other end coupled to the seat portion to elastically support the mass body.

The vibration actuator may further include a support portion disposed between the housing and the horizontal portion and elastically supporting the mass body.

The other inner surface of the housing may be provided with a projection portion corresponding to an outer diameter of the support portion, and the support portion may be inserted into and fixed to an inner portion of the projection portion and the horizontal portion.

The mass body may include a horizontal portion, an avoidance portion extended downwardly from an outer side of the horizontal portion, a seat portion bent from the avoidance portion in an outer radial direction, and an extension portion extended downwardly from the seat portion.

The vibration actuator may further include a support portion disposed between the housing and the horizontal portion and elastically supporting the mass body.

The other inner surface of the housing may be provided with a projection portion corresponding to an outer diameter of the support portion, and the support portion may be inserted into and fixed to an inner portion of the projection portion.

The vibration actuator may further include a first elastic member disposed between the piezoelectric element and the mass body, wherein the piezoelectric element may be disposed to be spaced apart from the mass body by a predetermined interval.

The mass body may include a horizontal portion, an avoidance portion formed to be bent downwardly from an outer side of the horizontal portion, and a seat portion bent from the avoidance portion in an outer radial direction.

The vibration actuator may further include a second elastic member having one end coupled to the housing and the other end coupled to the seat portion to elastically support the mass body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
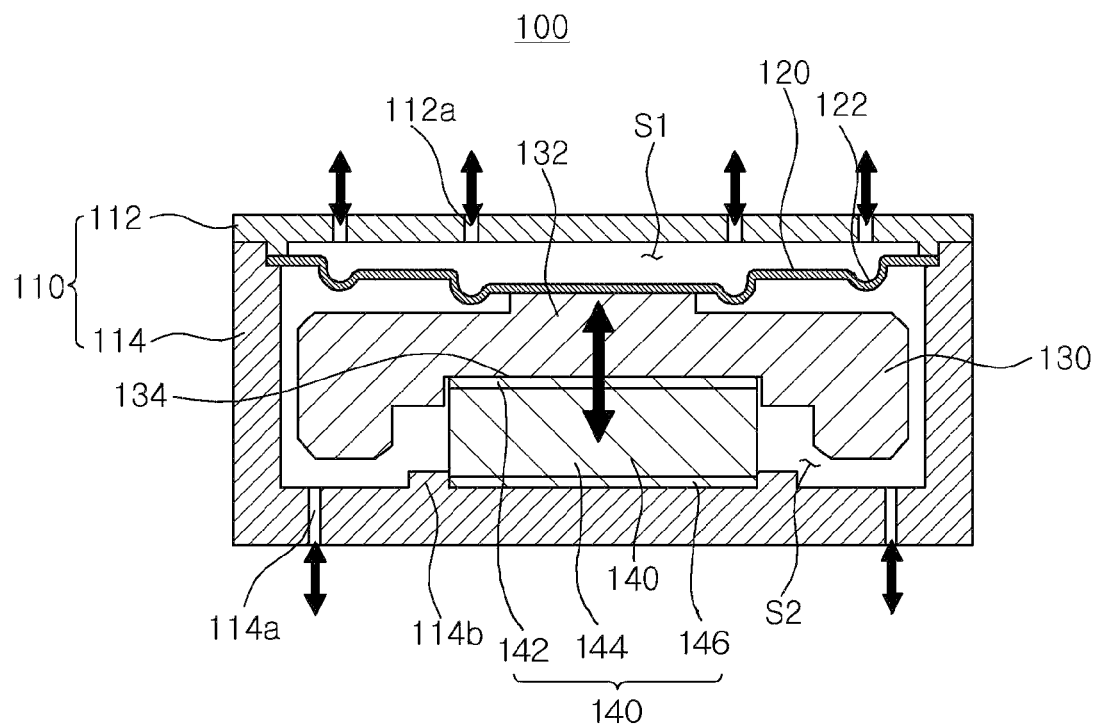
FIG. 1 is a schematic cross-sectional view showing a vibration actuator according to a first embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
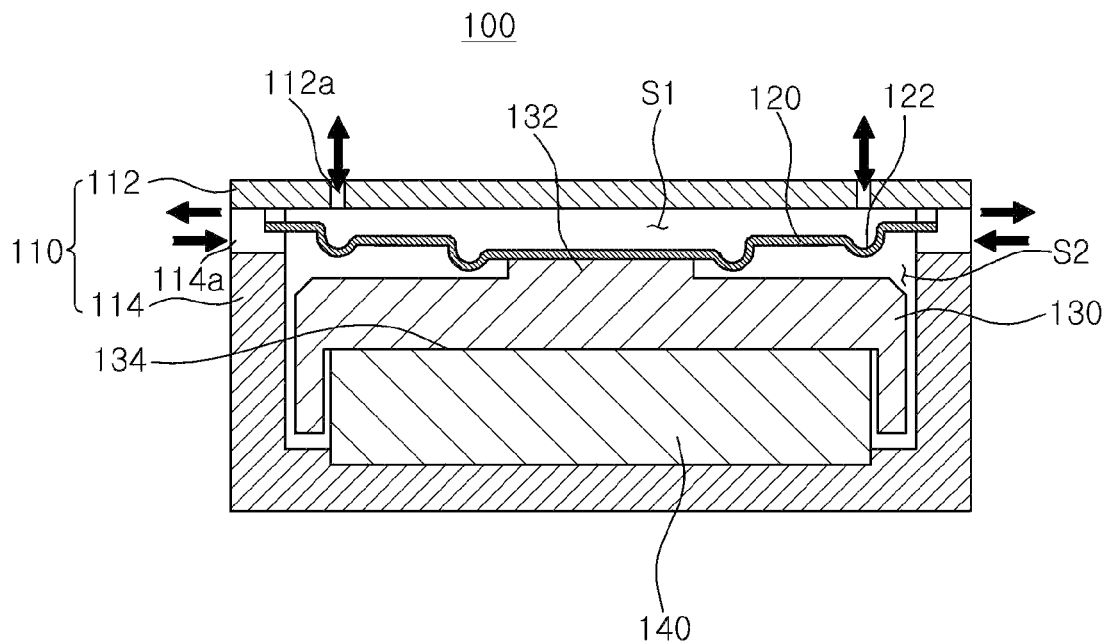
FIG. 2 is a schematic cross-sectional view showing a modified example of a mass body and a piezoelectric element of the vibration actuator according to the first embodiment of the present invention.
Figure 3:
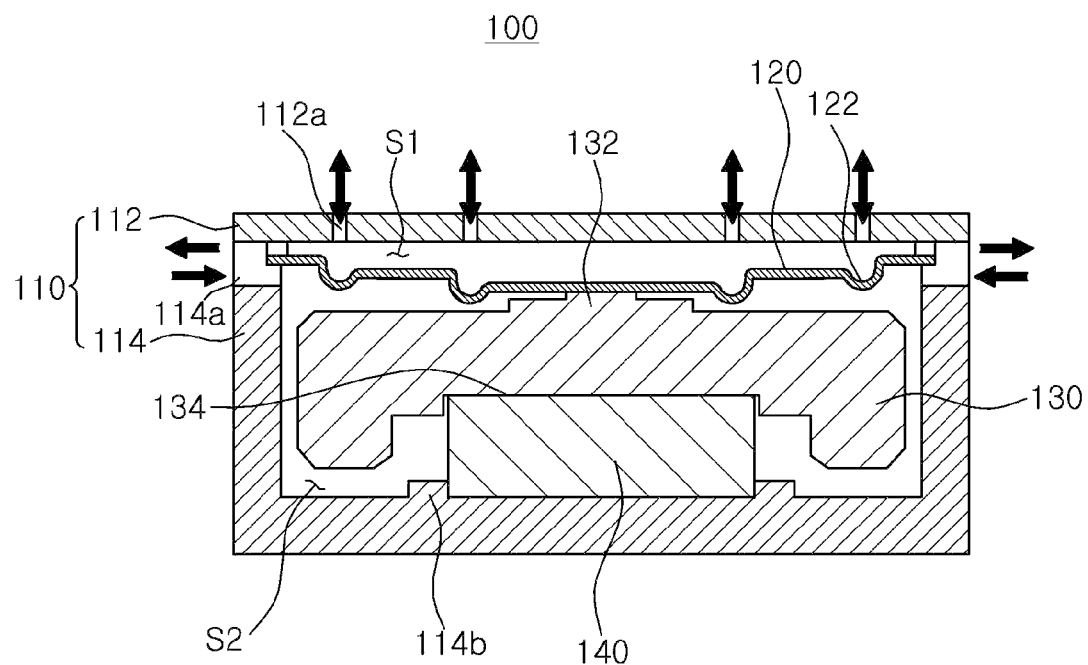
FIG. 3 is a schematic cross-sectional view showing a modified example of a mass body of the vibration actuator according to the first embodiment of the present invention.
Figure 4:
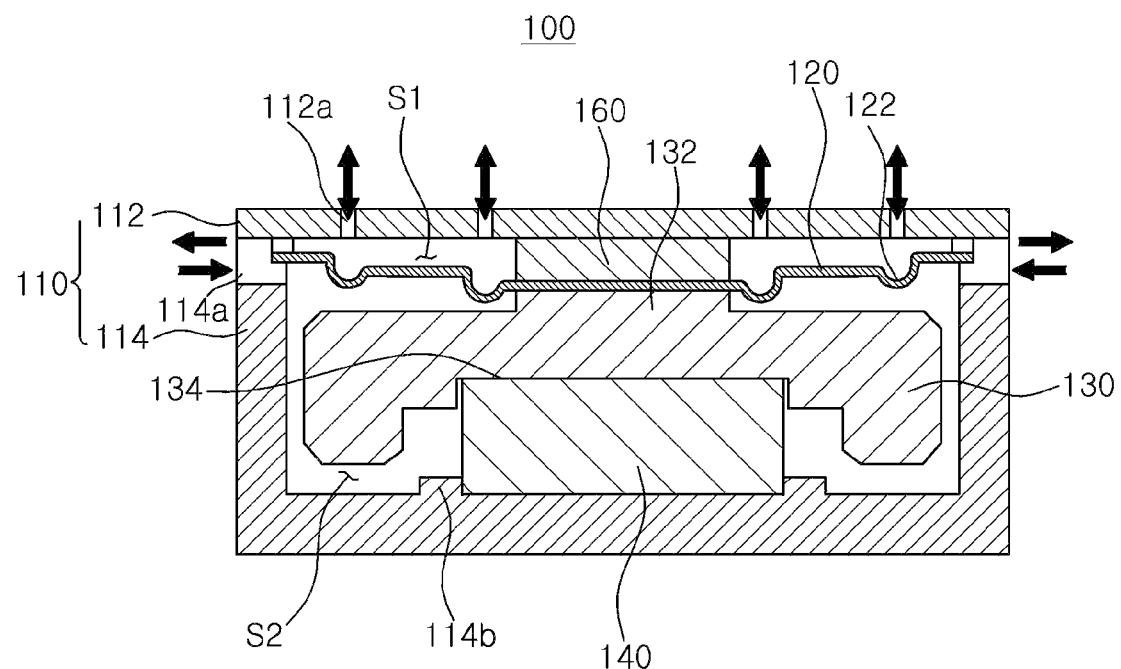
FIG. 4 is a schematic cross-sectional view showing a form in which the vibration actuator according to the first embodiment of the present invention further includes a support portion.
Figure 5:
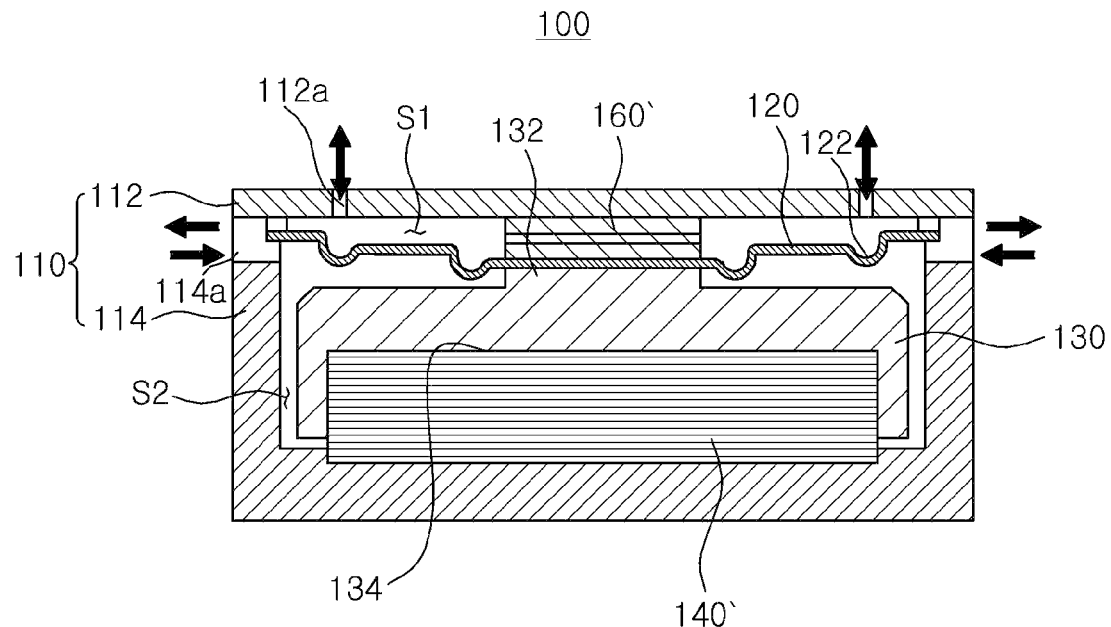
FIG. 5 is a schematic cross-sectional view showing a modified example of a support portion and a piezoelectric element of the vibration actuator according to the first embodiment of the present invention.

FIG. 1 is a schematic cross-sectional view showing a vibration actuator according to a first embodiment of the present invention; FIG. 2 is a schematic cross-sectional view showing a modified example of a mass body and a piezoelectric element of the vibration actuator according to the first embodiment of the present invention; FIG. 3 is a schematic cross-sectional view showing a modified example of a mass body of the vibration actuator according to the first embodiment of the present invention; FIG. 4 is a schematic cross-sectional view showing a form in which the vibration actuator according to the first embodiment of the present invention further includes a support portion; and FIG. 5 is a schematic cross-sectional view showing a modified example of a support portion and a piezoelectric element of the vibration actuator according to the first embodiment of the present invention.

Terms with respect to directions will be first defined. An outer radial direction or an inner radial direction refers to a direction from the center of a housing 112 toward an outer peripheral surface of the housing 112 or vice versa, and an upward direction or a downward direction refers to a direction from a second chamber S2 toward a first chamber S1 or vice versa.

Referring to FIGS. 1 through 5, a vibration actuator 100 according to the first embodiment of the present invention may include a housing 110 forming an appearance of the vibration actuator 100, a diaphragm 120, a mass body 130, and a piezoelectric element 140.

The housing 110 may include a lower housing 114 having an open side and providing a predetermined internal space and an upper housing 112 coupled to the open side of the lower housing 114.

The internal space may accommodate the mass body 130, the diaphragm 120, the piezoelectric element 140, and the like, therein, and the housing 110 may be integrally formed.

Here, the internal space may be divided into a first chamber S1 and a second chamber S2 by a diaphragm 120 to be described below, and the housing 110 may be provided with holes 112a and 114a such that the internal space may be in communication with the outside.

More specifically, the first chamber S1 and the second chamber S2 may be in communication with ambient air surrounding the housing 110 through the holes 112a and 114a, respectively.

More specifically, an upper internal space based on the diaphragm 120 may be the first chamber S1, and a lower internal space based on the diaphragm 120 may be the second chamber S2.

The holes 112a and 114a may be formed in a lower surface of the housing 110 so that the second chamber S2 may be in communication with the ambient air or be formed in an upper surface of the housing 110 so that the first chamber S1 may be in communication with the ambient air.

However, as shown in FIGS. 2 through 5, the holes 112a and 114a may also be formed in positions in which the diaphragm 120 is attached to the housing 110 on both sides of the housing 110 and the upper surface of the housing 110.

One inner surface of the housing 110 may be provided with an outer wall 114b protruding to correspond to an outer diameter of the piezoelectric element 140 to be described below, and the piezoelectric element 140 may be inserted into and fixed to an inner surface of the outer wall 114b, such that the piezoelectric element 140 may be more firmly coupled to one inner surface of the housing 110.

The diaphragm 120 may be disposed in the internal space provided by the housing 110 and separate the internal space into the first chamber S1 and the second chamber S2.

The diaphragm 120 may be formed of a material having elastic force, such as a metal, a plastic resin, rubber, or the like, and have one surface coupled to the mass body 130 to be described below to elastically support the mass body 130.

In addition, the diaphragm 120 includes at least one bent portion 122 formed therein and has a hemispherical shape, such that it may further improve elastic force.

The mass body 130 may be vibrated by the piezoelectric element 140 to be described below. In the vibration actuator 100 according to the first embodiment of the present invention, vibrations may be mediated by the diaphragm 120.

In the case in which the mass body 130 vibrates, the mass body 130 may have an outer diameter smaller than an inner diameter of an inner peripheral surface of the housing 110 so as to vibrate in the housing 110 without contact.

Therefore, a clearance having a predetermined size may be formed between the inner peripheral surface of the housing 110 and an outer peripheral surface of the mass body 130.

Therefore, the mass body 130 may be formed of a material such as tungsten, having specific gravity higher than that of iron, which is to increase the mass of the mass body 130 while maintaining a volume thereof, thereby increasing a vibration amount by as much as possible.

However, the mass body 130 is not limited to being formed of tungsten, but may also be formed of various materials according to the designer's intention.

The mass body 130 may include a protrusion portion 132 formed by protruding at least a portion of an upper surface thereof upwardly in order to be coupled to the diaphragm 120, and the protrusion portion 132 may be coupled to the diaphragm 120.

A cross section of the mass body 130 in a radial direction may be varied and may have a shape such as a circular shape, a rectangular shape, a square shape, a ring shape, or the like, according to shapes of the housing 110 and internal components.

In addition, the mass body 130 may include a coupling portion 134 provided by forming an upward depression in at least a portion of a lower surface thereof in order to contact the piezoelectric element 140 coupled to one inner surface of the housing 110 in a vibration process.

The mass body 130 may be disposed in one of the first and second chambers S1 and S2 into which the internal space is divided by the diaphragm 120. More specifically, the mass body 130 may be disposed in the second chamber S2.

The piezoelectric element 140, an element generating voltage when the element has mechanical pressure applied thereto and being mechanically deformed when the element has voltage applied thereto, may generate electrical polarization to generate a potential difference when the piezoelectric element 140 has external force applied thereto and deformed and having deformation force when piezoelectric element 140 has voltage applied thereto.

Therefore, the vibration actuator according to the embodiment of the present invention may obtain vibratory force by applying voltage to the piezoelectric element 140 to convert electrical energy into mechanical energy and include a separate circuit board for applying the voltage to the piezoelectric element 140.

The piezoelectric element 140 may include a lower electrode 146 serving as a common electrode, a piezoelectric film 144 deformed according to application of voltage, and an upper electrode 142 serving as a driving electrode.

The piezoelectric film 144 may be formed of a piezoelectric material, for example, a lead zirconate titanate (PZT) ceramic material, a crystal, a tourmaline, a Rochelle salt, barium titanate, monoammonium phosphate, tartaric acid ethylene diamine, or the like.

In the piezoelectric element 140, a single piezoelectric film 144 may be used or a plurality of piezoelectric films 144 may be used in a state in which they are overlapped with each other.

In the case in which the plurality of piezoelectric films 144 are used to configure the piezoelectric element 140, a greater amount of vibratory force may be obtained.

The piezoelectric element 140 may be disposed under the mass body 130. More specifically, the piezoelectric element 140 may be disposed to contact the mass body 130.

Here, the piezoelectric element 140 may have a lower surface coupled to one inner surface of the housing 110 and an upper surface contacting the coupling portion 134 of the mass body 130.

Since the piezoelectric element 140 contacts the mass body 130, vibratory force caused by the piezoelectric element 140 may be transferred directly to the mass body 130.

Referring to FIG. 4, the vibration actuator 100 according to the first embodiment of the present invention may further include a support portion 160 disposed between the diaphragm 120 and the housing 110.

That is, the support portion 160 may be disposed in a chamber different from the chamber in which the mass body 130 is disposed and be coupled to the diaphragm 120 to elastically support the mass body 130.

The support portion 160 may be formed of a single elastic material or be configured of a plurality of layers having various elastic materials as shown in FIG. 5.

Hereinafter, a cooling system capable of cooling heat generated in a process of driving the vibration actuator according to the embodiment of the present invention will be described.

When voltage is applied to the piezoelectric element 140, electrical energy is converted into mechanical energy, such that the vibratory force may be obtained and the mass body 130 may be vibrated by the vibratory force.

As the mass body 130 vibrates, volumes of the first and second chambers S1 and S2 may be changed. When the volumes of the first and second chambers S1 and S2 are changed, air flow may occur through the holes 112a and 114a formed in the housing 110.

In the case in which the volume of the second chamber S2 in which the mass body 130 is disposed increases and the volume of the first chamber S1 decreases due to the vibration of the mass body 130, pressure in the second chamber S2 may decrease and pressure in the first chamber S1 may increase.

Therefore, ambient air may flow into the second chamber S2 through the holes 112a and 114a formed in the housing 110, and air in the first chamber S1 may be discharged to the outside through the holes 112a and 114a formed in the housing 110.

On the other hand, in the case in which the volume of the second chamber S2 in which the mass body 130 is disposed decreases and the volume of the first chamber S1 increases due to the vibration of the mass body 130, pressure in the second chamber S2 may increase and pressure in the first chamber S1 may decrease.

Therefore, ambient air may flow into the first chamber S1 through the holes 112a and 114a formed in the housing 110, and air in the second chamber S2 may be discharged to the outside through the holes 112a and 114 formed in the housing 110.

As the mass body 130 vibrates, the volumes of the first and second chambers S1 and S2 are continuously changed, such that the ambient air may be continuously introduced into the housing 110. The air introduced into the housing 110 as described above may cool the heat generated in the process of driving the vibration actuator to configure a cooling system.

Figure 6:
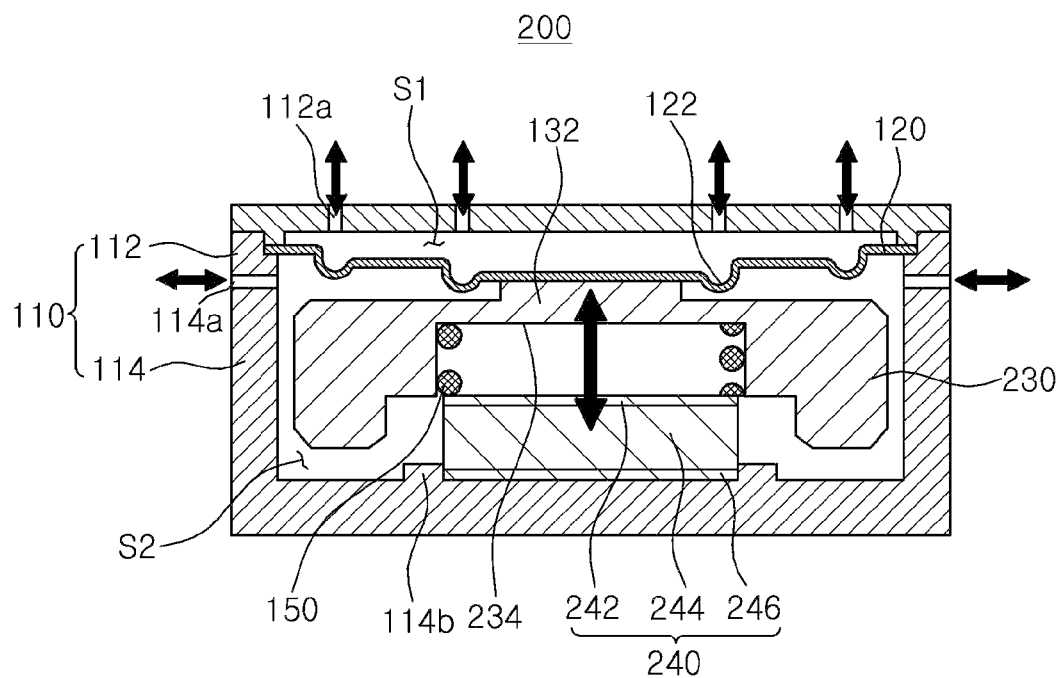
FIG. 6 is a schematic cross-sectional view showing a vibration actuator according to a second embodiment of the present invention.
Figure 7:
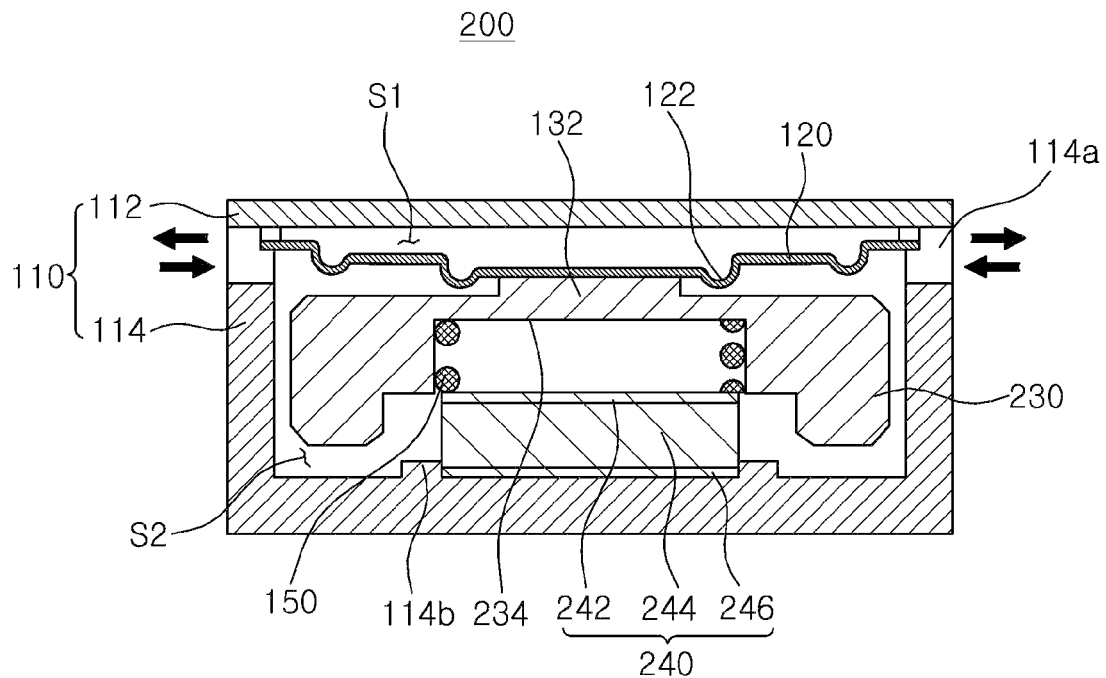
FIG. 7 is a schematic cross-sectional view showing a modified example of a hole position in the vibration actuator according to the second embodiment of the present invention.
Figure 8:
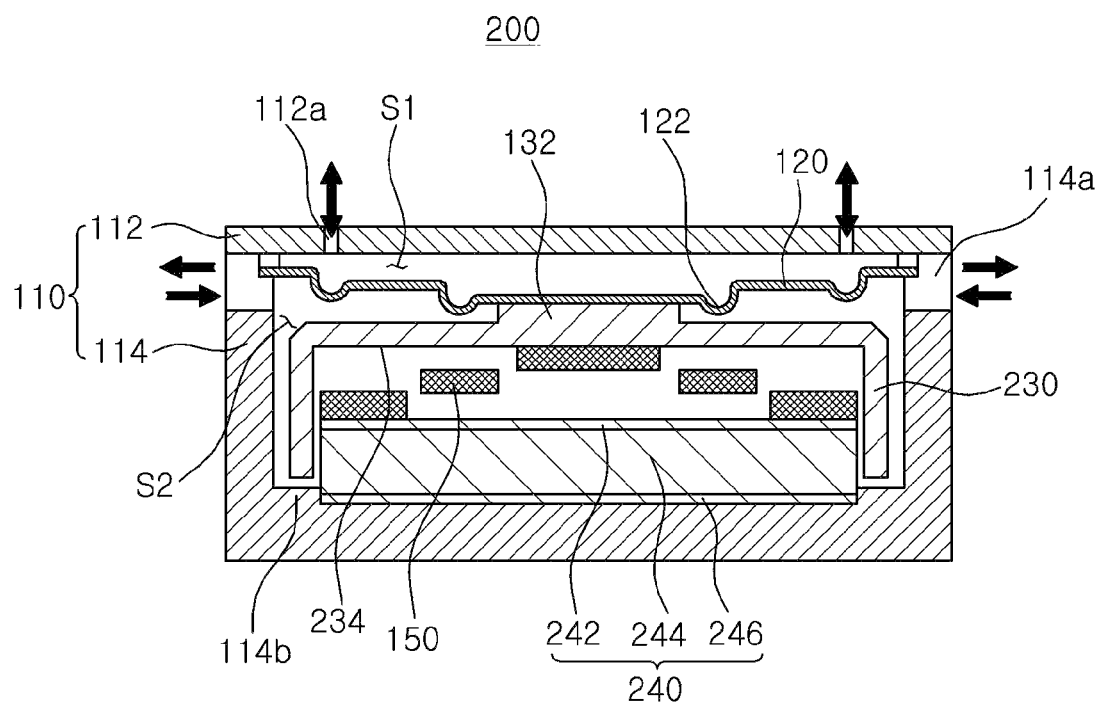
FIG. 8 is a schematic cross-sectional view showing a modified example of a hole position and a mass body in the vibration actuator according to the second embodiment of the present invention.
Figure 9:
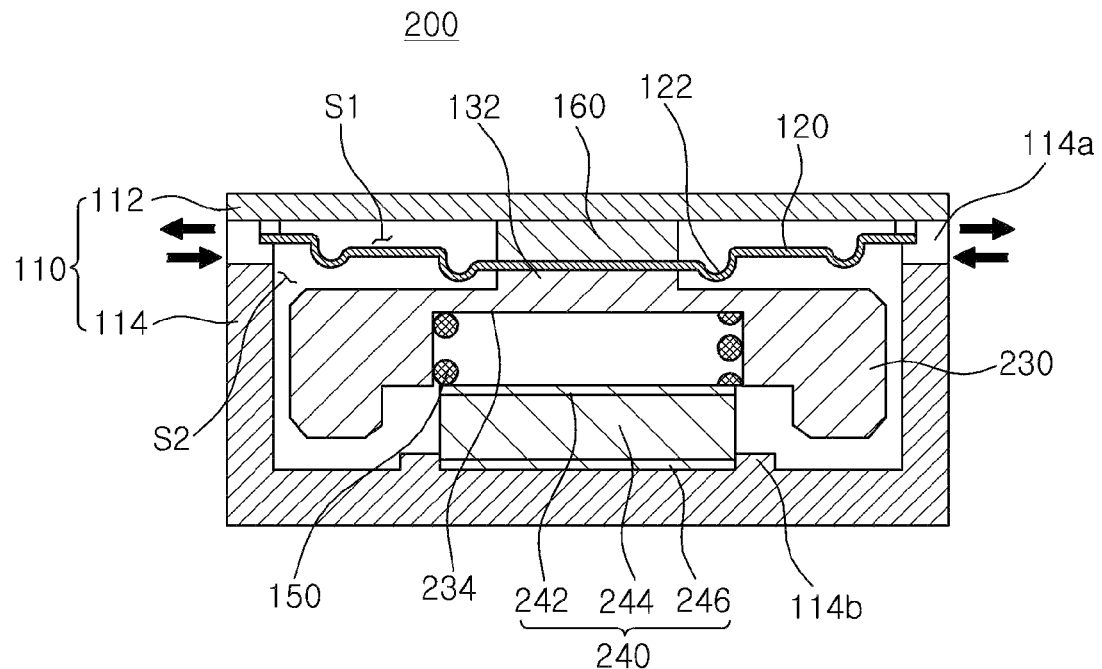
FIG. 9 is a schematic cross-sectional view showing a form in which the vibration actuator according to the second embodiment of the present invention further includes a support portion.
Figure 10:
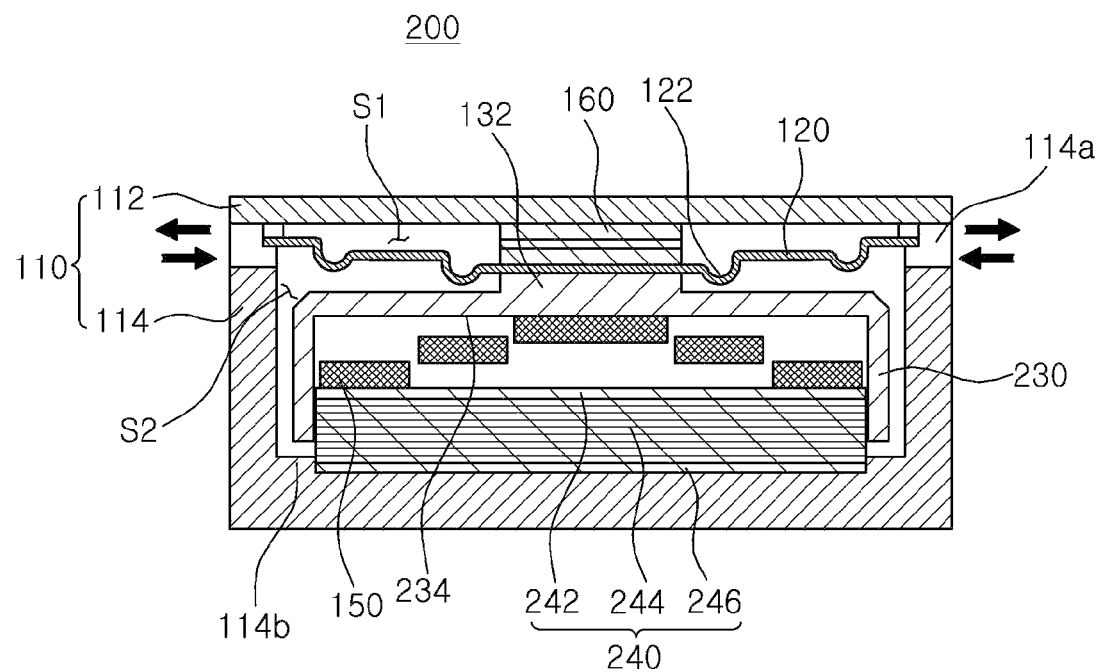
FIG. 10 is a schematic cross-sectional view showing a modified example of a support portion and a piezoelectric element of the vibration actuator according to the second embodiment of the present invention.

FIG. 6 is a schematic cross-sectional view showing a vibration actuator according to a second embodiment of the present invention; FIG. 7 is a schematic cross-sectional view showing a modified example of a hole position in the vibration actuator according to the second embodiment of the present invention; FIG. 8 is a schematic cross-sectional view showing a modified example of a hole position and a mass body in the vibration actuator according to the second embodiment of the present invention; FIG. 9 is a schematic cross-sectional view showing a form in which the vibration actuator according to the second embodiment of the present invention further includes a support portion; and FIG. 10 is a schematic cross-sectional view showing a modified example of a support portion and a piezoelectric element of the vibration actuator according to the second embodiment of the present invention.

Referring to FIGS. 6 through 10, a vibration actuator 200 according to the second embodiment of the present invention is the same as the vibration actuator 100 according to the first embodiment of the present invention except for a mass body 230, a piezoelectric element 240, and a first elastic member 150. Therefore, a description of components other than the mass body 230, the piezoelectric element 240, and the first elastic member 150 will be omitted.

A cross section of the mass body 230 in a radial direction may be varied and may have a shape such as a circular shape, a rectangular shape, a square shape, a ring shape, or the like, according to shapes of the housing 110 and internal components.

In addition, the mass body 230 may include a contact preventing portion 234 provided by forming an upward depression in at least a portion of a lower surface thereof in order to prevent the piezoelectric element 240 coupled to one inner surface of the housing 110 and the mass body 230 from contacting each other in a vibration process.

Therefore, the mass body 230 and the piezoelectric element 240 may be disposed to be spaced apart from each other by a predetermined interval.

The piezoelectric element 240 may have a lower surface coupled to one inner surface of the housing 110 and an upper surface facing the contact preventing portion 234 formed on the mass body 230. Here, the piezoelectric element 240 may include a lower electrode 246 serving as a common electrode, a piezoelectric film 244 deformed according to application of voltage, and an upper electrode 242 serving as a driving electrode. In the piezoelectric element 240, a single piezoelectric film 244 may be used or a plurality of piezoelectric films 244 may be used, as shown in FIG. 10, in a state in which they are overlapped with each other.

The first elastic member 150 may be disposed between the piezoelectric element 240 and the mass body 230 and elastically supporting the mass body 230.

Therefore, the first elastic member 150 may transfer vibratory force transferred from the piezoelectric element 240 to the mass body 230 to allow the mass body 230 to vibrate.

That is, in the present embodiment, the vibrations may be mediated by the first elastic member 150.

Here, a natural vibration frequency of the first elastic member 150 may coincide with an operation frequency of the piezoelectric element 240.

This is to significantly increase the vibratory force applied to the mass body 230 to obtain a large vibration amount.

Figure 11:
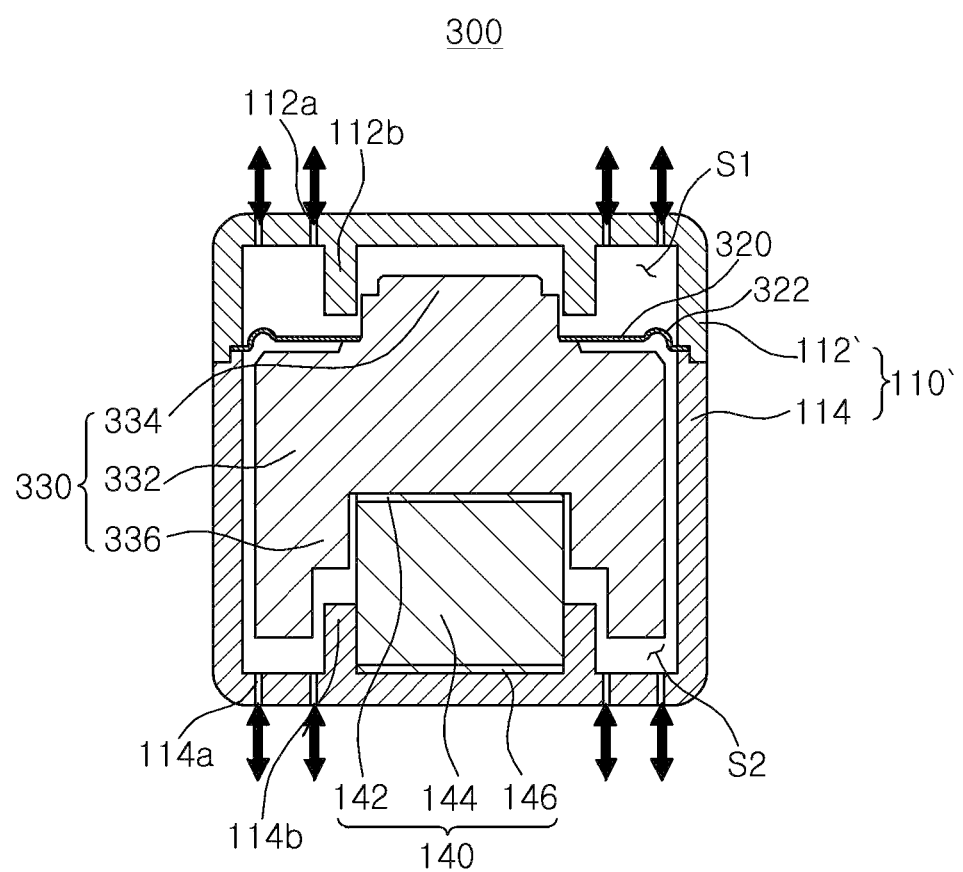
FIG. 11 is a schematic cross-sectional view showing a vibration actuator according to a third embodiment of the present invention.
Figure 12:
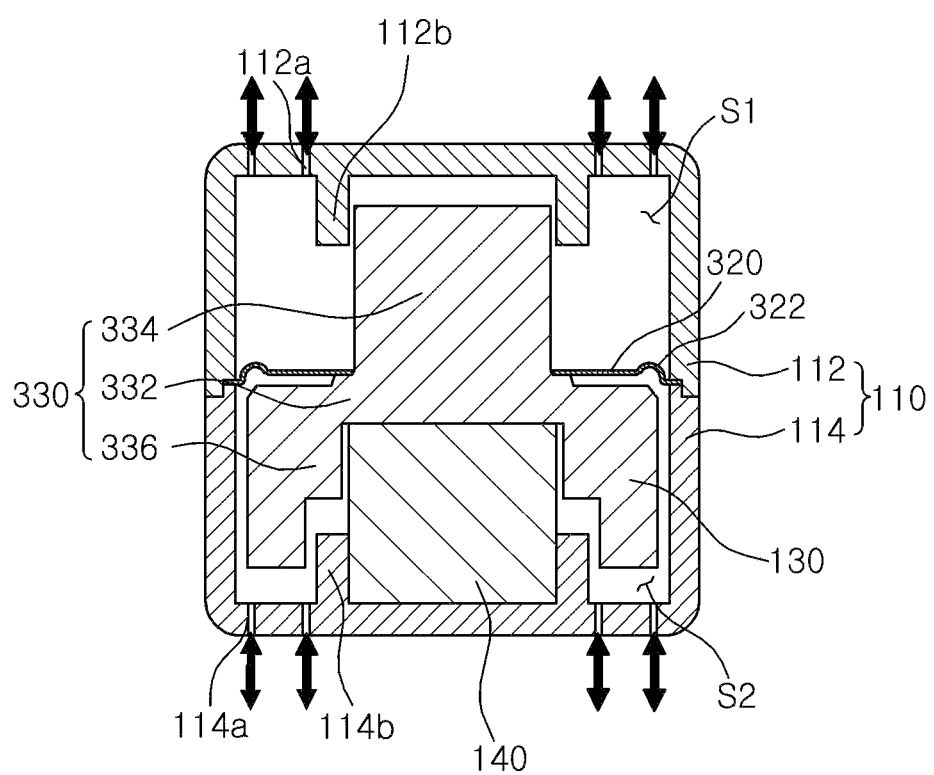
FIG. 12 is a schematic cross-sectional view showing a modified example of a mass body of the vibration actuator according to the third embodiment of the present invention.

FIG. 11 is a schematic cross-sectional view showing a vibration actuator according to a third embodiment of the present invention; and FIG. 12 is a schematic cross-sectional view showing a modified example of a mass body of the vibration actuator according to the third embodiment of the present invention.

Referring to FIGS. 11 and 12, a vibration actuator 300 according to the third embodiment of the present invention is the same as the vibration actuator 100 according to the first embodiment of the present invention, except for a mass body 330, a diaphragm 320, and a housing 110'. Therefore, a description of components other than the mass body 330, the diaphragm 320, and the housing 110' will be omitted.

The mass body 330 may include a horizontal portion 332, a protrusion portion 334 protruding upwardly from a central portion of the horizontal portion 332, and an avoidance portion 336 extended downwardly from an outer side of the horizontal portion 332.

The diaphragm 320 may have one end coupled to the horizontal portion 332 of the mass body 330 and the other end coupled to the housing 110' to separate an internal space of the housing 110' together with the mass body 330.

The diaphragm 320 may be formed of a material having elastic force, such as a metal, a plastic resin, rubber, or the like, and be coupled to the horizontal portion 332 of the mass body 330 to elastically support the mass body 330.

In addition, the diaphragm 320 includes at least one bent portion 322 formed in one surface thereof and having a hemispherical shape, such that it may further improve elastic force of the diaphragm 320.

The other inner surface of the housing 110' may be provided with a projection portion 112b protruding to have an inner diameter larger than an outer diameter of the protrusion portion 334 of the mass body 330.

Similar to the vibration actuator 100 according to the first embodiment of the present invention, in the vibration actuator 300 according to the third embodiment of the present invention, the piezoelectric element 140 contacts the mass body 330, such that vibratory force produced by the piezoelectric element 140 may be directly transferred to the mass body 330.

Therefore, the mass body 330 may vibrate through the diaphragm 320 having elastic force.

Figure 13:
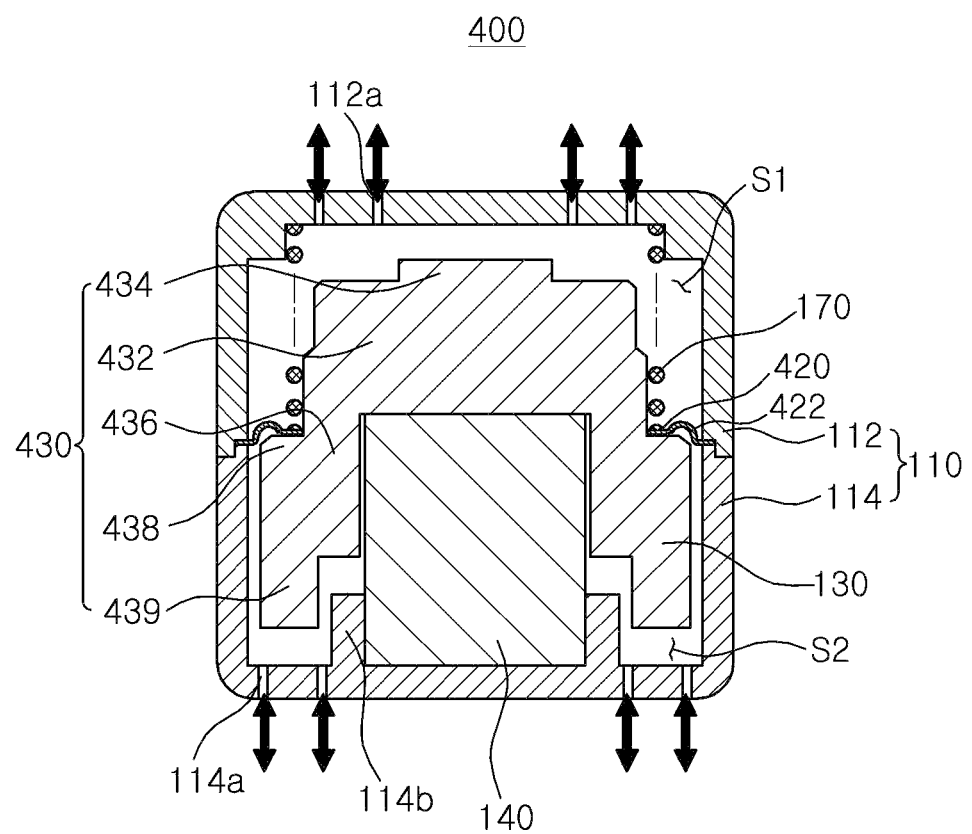
FIG. 13 is a schematic cross-sectional view showing a vibration actuator according to a fourth embodiment of the present invention.
Figure 14:
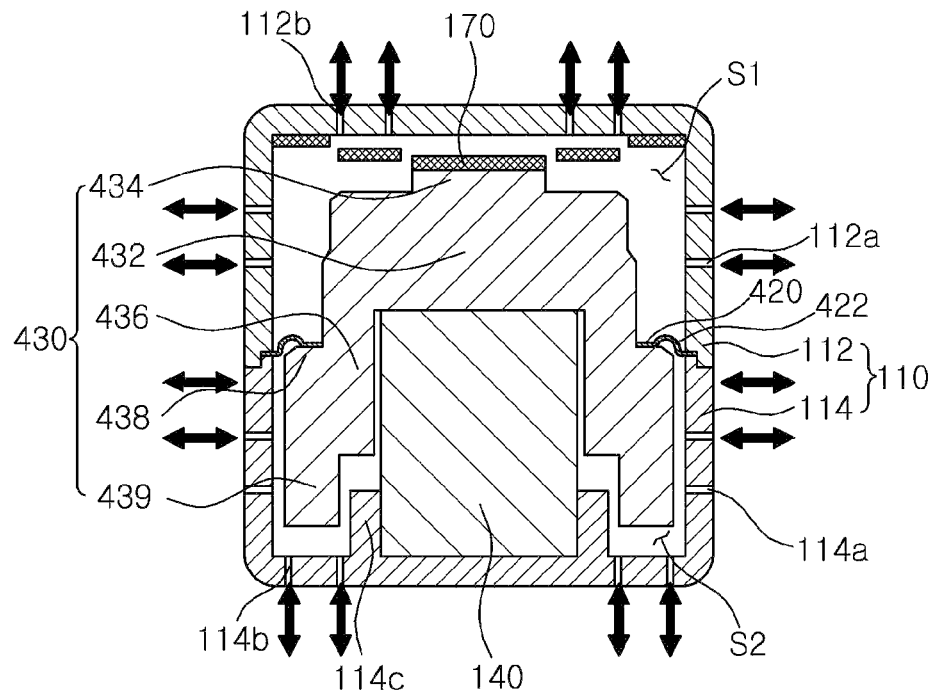
FIG. 14 is a schematic cross-sectional view showing a modified example of a second elastic member of the vibration actuator according to the fourth embodiment of the present invention.

FIG. 13 is a schematic cross-sectional view showing a vibration actuator according to a fourth embodiment of the present invention; and FIG. 14 is a schematic cross-sectional view showing a modified example of a second elastic member of the vibration actuator according to the fourth embodiment of the present invention.

Referring to FIGS. 13 and 14, a vibration actuator 400 according to the fourth embodiment of the present invention is the same as the vibration actuator 100 according to the first embodiment of the present invention except for a mass body 430, a diaphragm 420, and a second elastic member 170. Therefore, a description of components other than the mass body 430, the diaphragm 420, and the second elastic member 170 will be omitted.

The mass body 430 may include a horizontal portion 432, a protrusion portion 434 protruding upwardly from a central portion of the horizontal portion 432, an avoidance portion 436 extended downwardly from an outer side of the horizontal portion 432, a seat portion 438 extended from the avoidance portion 436 in the outer radial direction, and an extension portion 439 extended downwardly from the seat portion 438.

The diaphragm 420 may have one end coupled to the seat portion 438 of the mass body 430 and the other end coupled to the housing 110 to separate the internal space of the housing 110 together with the mass body 430.

Similar to the vibration actuator 100 according to the first embodiment of the present invention, in the vibration actuator 400 according to the fourth embodiment of the present invention, the piezoelectric element 140 contacts the mass body 430, such that vibratory force by the piezoelectric element 140 may be transferred directly to the mass body 430.

Meanwhile, the vibration actuator 400 according to the fourth embodiment of the present invention may further include the second elastic member 170.

As shown in FIG. 13, the second elastic member 170 may have one end coupled to the housing 110 and the other end coupled to the seat portion 438 of the mass body 430 to elastically support the mass body 430.

In addition, as shown in FIG. 14, the second elastic member 170 may also have one end coupled to the housing 110 and the other end coupled to the protrusion portion 434 of the mass body 430 to elastically support the mass body 430.

Therefore, the mass body 430 may directly receive vibratory force from the piezoelectric element 140 to vibrate through the second elastic member 170.

Figure 15:
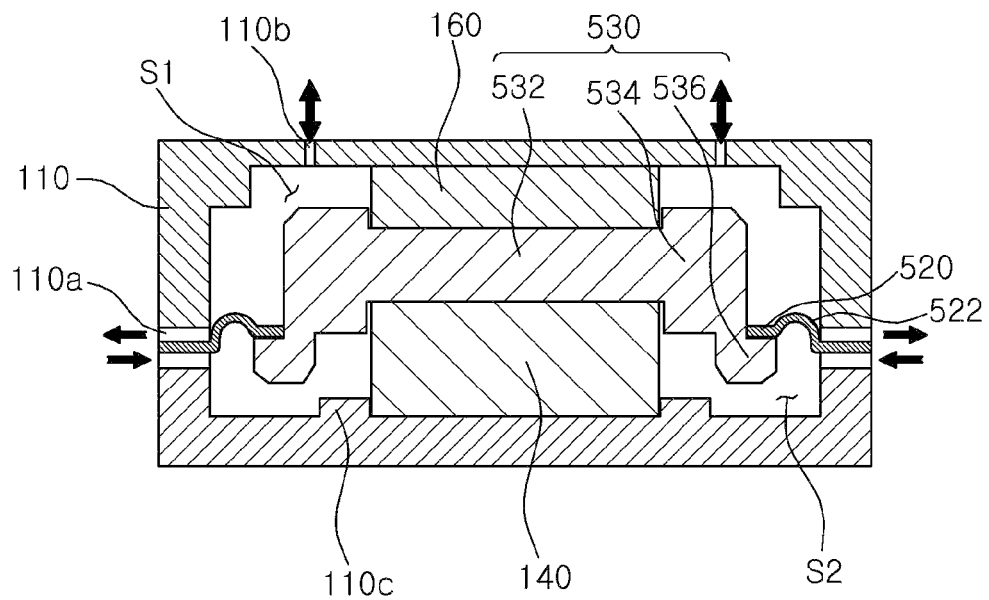
FIG. 15 is a schematic cross-sectional view showing a vibration actuator according to a fifth embodiment of the present invention.
Figure 16:
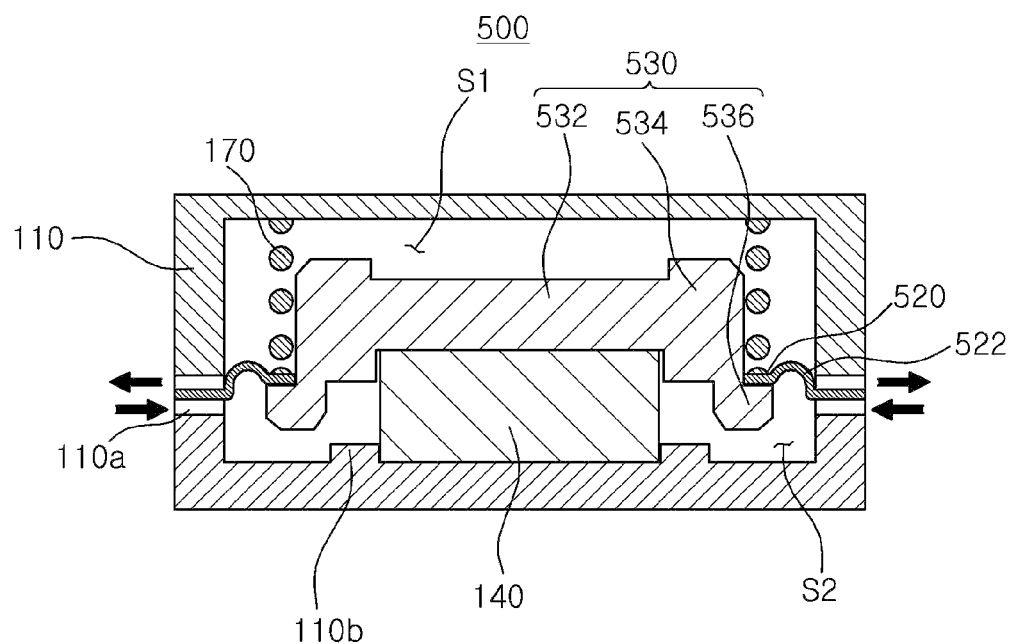
FIG. 16 is a schematic cross-sectional view showing a form in which the vibration actuator according to the fifth embodiment of the present invention further includes a second elastic member instead of a support portion.

FIG. 15 is a schematic cross-sectional view showing a vibration actuator according to a fifth embodiment of the present invention; FIG. 16 is a schematic cross-sectional view showing a form in which the vibration actuator according to the fifth embodiment of the present invention further includes a second elastic member instead of a support portion; and FIG. 17 is a schematic cross-sectional view showing a form in which the vibration actuator according to the fifth embodiment of the present invention further includes a second elastic member.

Figure 17:
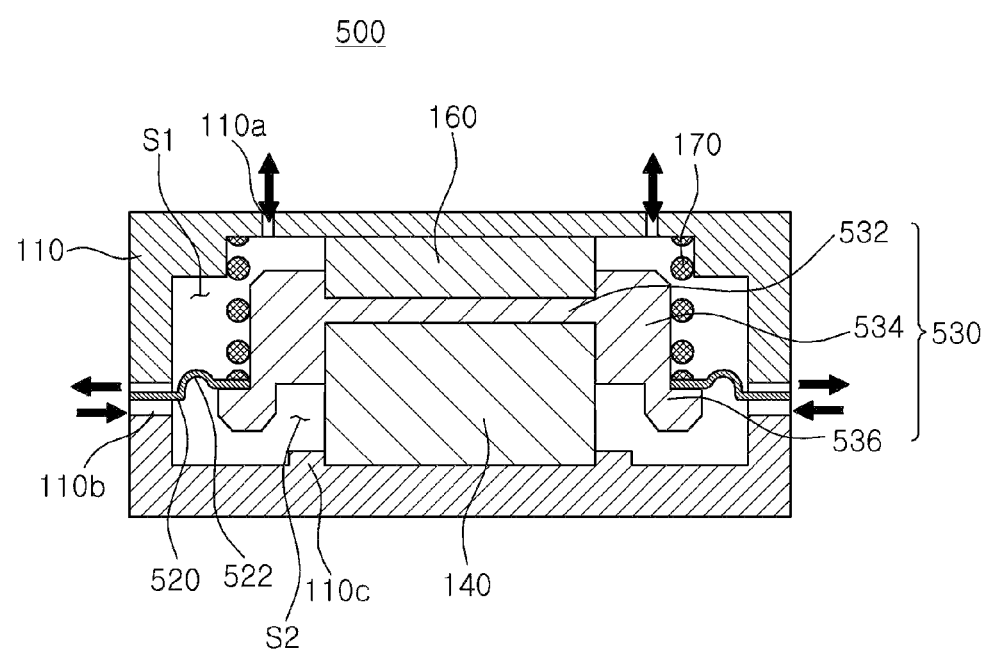
FIG. 17 is a schematic cross-sectional view showing a form in which the vibration actuator according to the fifth embodiment of the present invention further includes a second elastic member.

Referring to FIGS. 15 through 17, a vibration actuator 500 according to the fifth embodiment of the present invention is the same as the vibration actuator 100 according to the first embodiment of the present invention except for a mass body 530, a diaphragm 520, the support portion 160, and the second elastic member 170. Therefore, a description of components other than the mass body 530, the diaphragm 520, the support portion 160, and the second elastic member 170 will be omitted.

The mass body 530 may include a horizontal portion 532, a vertical portion 534 extended from an outer side of the horizontal portion 532 in a vertical direction, and a seat portion 536 formed to be bent from a lower portion of the vertical portion 534 in the outer radial direction.

The diaphragm 520 may have one end coupled to the seat portion 536 of the mass body 530 and the other end coupled to the housing 110 to separate the internal space of the housing 110 together with the mass body 530. In addition, the diaphragm 520 includes at least one bent portion 522 formed in one surface thereof and having a hemispherical shape, such that it may further improve elastic force of the diaphragm 520. Here, the housing 110 may be provided with holes 110a and 110b such that the internal space may be in communication with the outside. Also, one inner surface of the housing 110 may be provided with an outer wall 110c protruding to correspond to an outer diameter of the piezoelectric element 140, and the piezoelectric element 140 may be inserted into and fixed to an inner surface of the outer wall 110c, such that the piezoelectric element 140 may be more firmly coupled to one inner surface of the housing 110.

The support portion 160 may be disposed between the housing and the horizontal portion 532 to elastically support the mass body 530.

Referring to FIGS. 16 and 17, the vibration actuator 500 according to the fifth embodiment of the present invention may further include the second elastic member 170.

More specifically, the second elastic member 170 may be coupled to the seat portion 536 to elastically support the mass body 630 and have a natural vibration frequency coinciding with that of the piezoelectric element 140.

Therefore, the mass body 530 may receive vibratory force from the piezoelectric element 140 to vibrate through the second elastic member 170 and the support portion 160.

However, as shown in FIG. 15, the mass body 530 may also be elastically supported by the support portion 160 only having elastic force without the second elastic member 170.

Figure 18:
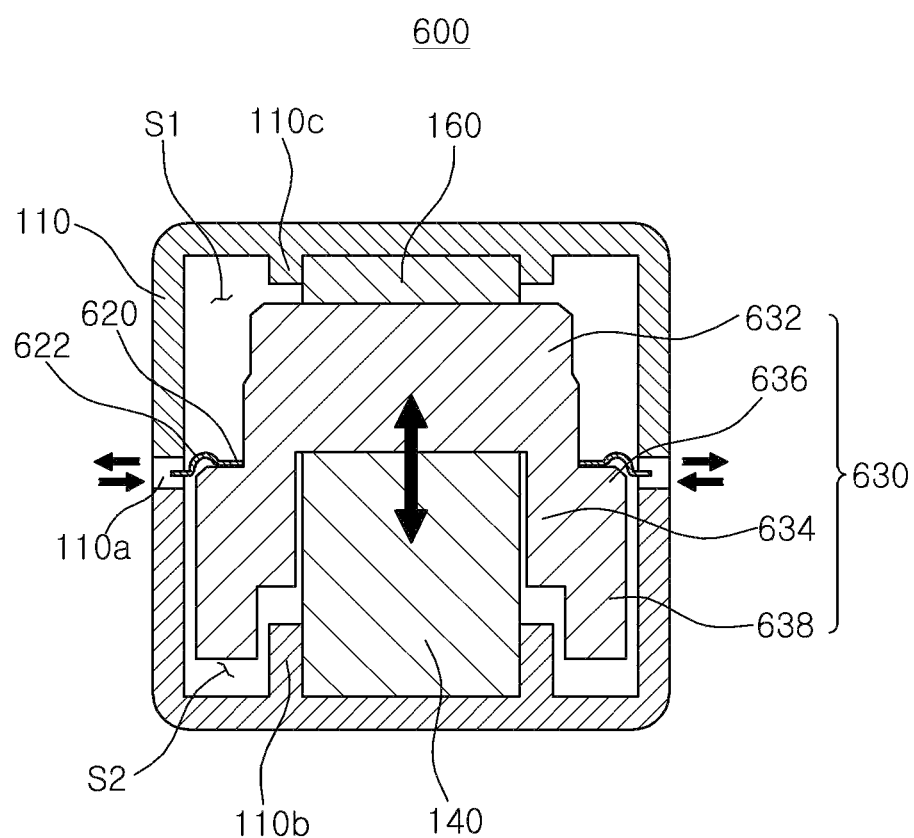
FIG. 18 is a schematic cross-sectional view showing a vibration actuator according to a sixth embodiment of the present invention.

FIG. 18 is a schematic cross-sectional view showing a vibration actuator according to a sixth embodiment of the present invention.

Referring to FIG. 18, a vibration actuator 600 according to the sixth embodiment of the present invention is the same as the vibration actuator 400 according to the fourth embodiment of the present invention except for a mass body 630, the housing 110, and the support portion 160. Therefore, a description of components other than the mass body 630, the housing 110, and the support portion 160 will be omitted.

The mass body 630 may include a horizontal portion 632, an avoidance portion 634 extended downwardly from an outer side of the horizontal portion 632, a seat portion 636 bent from the avoidance portion 634 in the outer radial direction, and an extension portion 638 extended downwardly from the seat portion 636. In addition, a diaphragm 620 may have one end coupled to the seat portion 636 of the mass body 630 and the other end coupled to the housing 110 to separate the internal space of the housing 110 together with the mass body 630. In addition, the diaphragm 620 includes at least one bent portion 622 formed in one surface thereof and having a hemispherical shape, such that it may further improve elastic force of the diaphragm 620.

The housing 110 may be provided with holes 110a such that the internal space may be in communication with the outside. Also, one inner surface of the housing 110 may be provided with an outer wall 110b protruding to correspond to an outer diameter of the piezoelectric element 140, and the piezoelectric element 140 may be inserted into and fixed to an inner surface of the outer wall 110b, such that the piezoelectric element 140 may be more firmly coupled to one inner surface of the housing 110. In addition, the other inner surface of the housing 110 may be provided with a projection portion 110c protruding to correspond to an outer diameter of the support portion 160 to be described below. Therefore, the support 160 may be insertedly fixed to an inner surface of the projection portion 110c to thereby be more firmly coupled to one inner surface of the housing 110.

The support portion 160 may have an upper surface contacting one inner surface of the housing 110 and a lower surface contacting an upper surface of the horizontal portion 632 of the mass body 630.

That is, the support portion 160 may be disposed between the housing 110 and the mass body 630 to elastically support the mass body 630.

Figure 19:
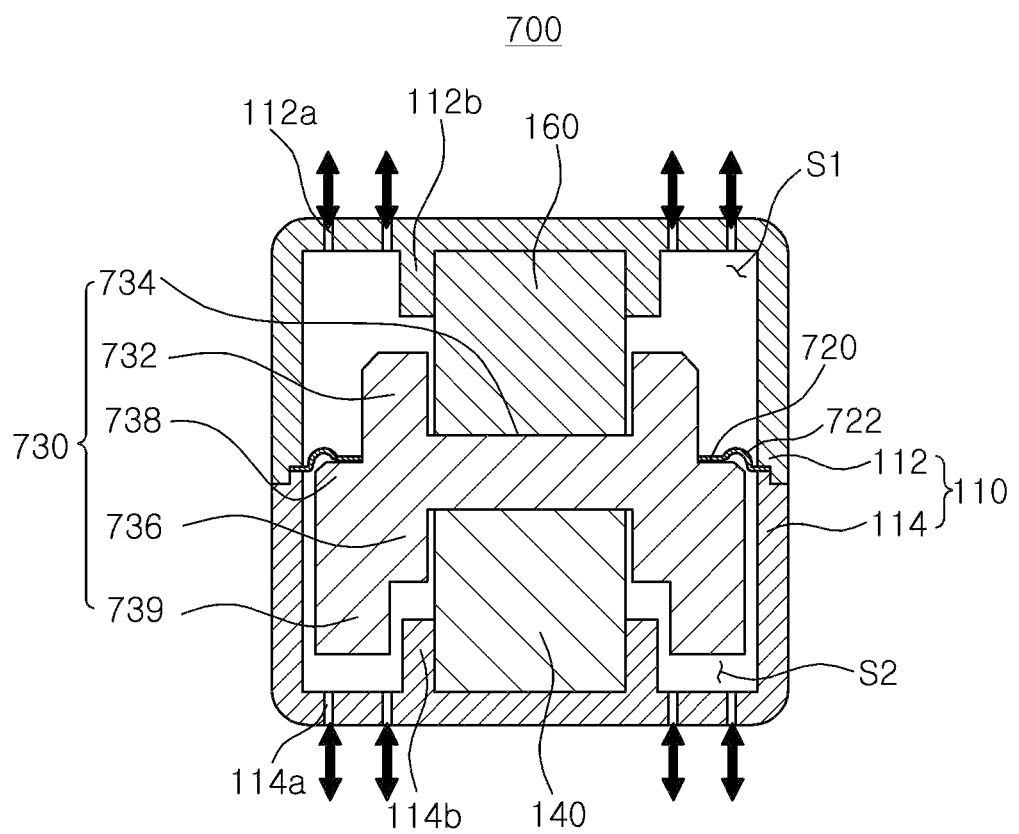
FIG. 19 is a schematic cross-sectional view showing a vibration actuator according to a seventh embodiment of the present invention.
Figure 20:
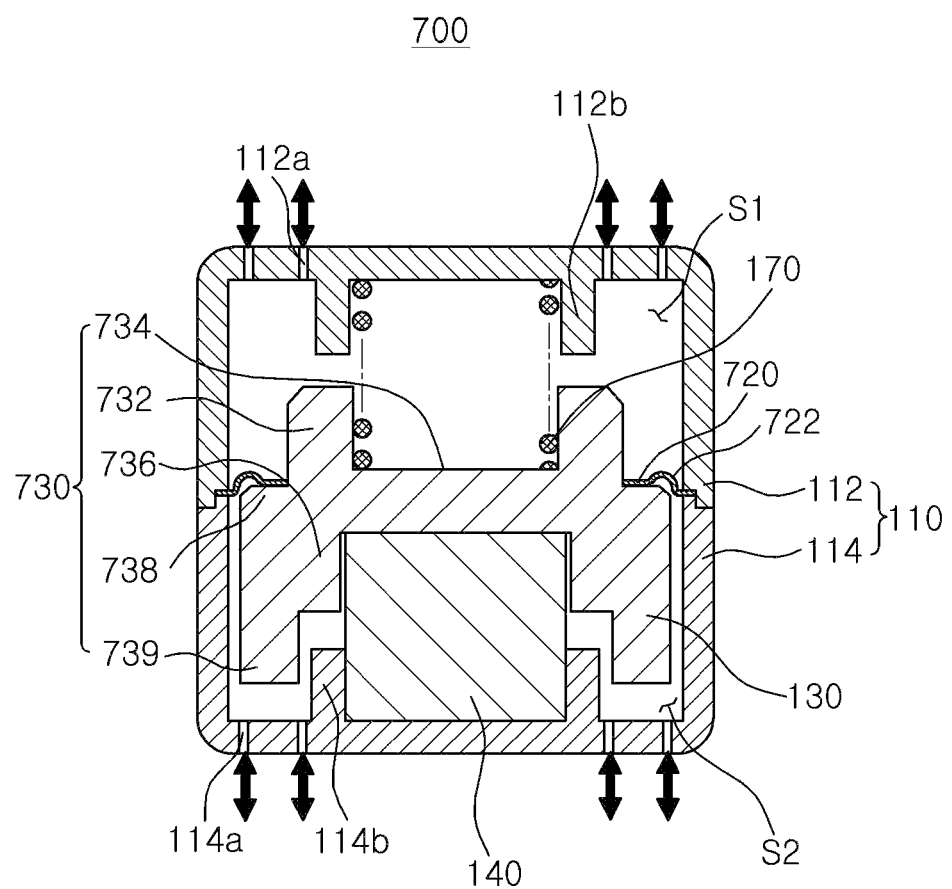
FIG. 20 is a schematic cross-sectional view showing a form in which the vibration actuator according to the seventh embodiment of the present invention further includes a second elastic member disposed on a mass body, instead of a support portion.

FIG. 19 is a schematic cross-sectional view showing a vibration actuator according to a seventh embodiment of the present invention; and FIG. 20 is a schematic cross-sectional view showing a form in which the vibration actuator according to the seventh embodiment of the present invention further includes a second elastic member disposed on a mass body, instead of a support portion.

Referring to FIGS. 19 and 20, a vibration actuator 700 according to the seventh embodiment of the present invention is the same as the vibration actuator 600 according to the sixth embodiment of the present invention except for a mass body 730 and the second elastic member 170. Therefore, a description of components other than the mass body 730 and the second elastic member 170 will be omitted.

The mass body 730 may include a horizontal portion 732, a fixing portion 734 formed to be depressed downwardly from a central portion of the horizontal portion 732, an avoidance portion 736 extended downwardly from both distal ends of the horizontal portion 732, a seat portion 738 bent from the avoidance portion 736 in the outer radial direction, and an extension portion 739 extended downwardly from the seat portion 738. In addition, a diaphragm 720 may have one end coupled to the seat portion 738 of the mass body 730 and the other end coupled to the housing 110 to separate the internal space of the housing 110 together with the mass body 730. In addition, the diaphragm 720 includes at least one bent portion 722 formed in one surface thereof and having a hemispherical shape, such that it may further improve elastic force of the diaphragm 720.

Referring to FIG. 19, the support portion 160 may be coupled to one inner surface of the housing 110 and the fixing portion 734 of the mass body 730 to firmly fix the support portion 160.

Since the support portion 160 has elastic force, it may elastically support the mass body 730.

Referring to FIG. 20, the second elastic member 170 may be disposed between the housing 110 and the fixing portion 734, instead of the support portion 160.

Therefore, the mass body 730 may receive vibratory force from the piezoelectric element 140 to vibrate through the second elastic member 170.

Figure 21:
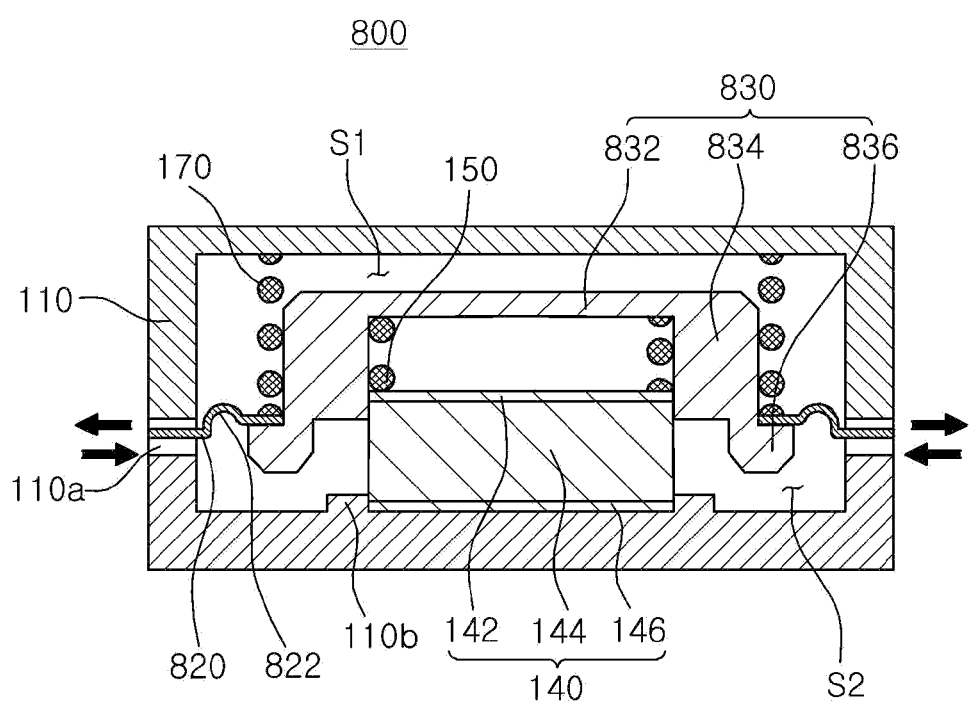
FIG. 21 is a schematic cross-sectional view showing a vibration actuator according to an eighth embodiment of the present invention.

FIG. 21 is a schematic cross-sectional view showing a vibration actuator according to an eighth embodiment of the present invention.

Referring to FIG. 21, a vibration actuator 800 according to the eighth embodiment of the present invention is the same as the vibration actuator 200 according to the second embodiment of the present invention except for a mass body 830, a diaphragm 820, and the second elastic member 170. Therefore, a description of components other than the mass body 830, the diaphragm 820, and the second elastic member 170 will be omitted.

The mass body 830 may be vibrated by the piezoelectric element 140 to be described below. The vibrations may be mediated by the first and second elastic members 150 and 170.

The mass body 830 may include a horizontal portion 832, an avoidance portion 834 bent downwardly from an outer side of the horizontal portion 832, and a seat portion 836 bent from the avoidance portion 834 in the outer radial direction.

The diaphragm 820 may have one end coupled to the seat portion 836 of the mass body 830 and the other end coupled to the housing 110 to separate the internal space of the housing 110 together with the mass body 830. In addition, the diaphragm 820 includes at least one bent portion 822 formed in one surface thereof and having a hemispherical shape, such that it may further improve elastic force of the diaphragm 820. Here, the housing 110 may be provided with holes 110a such that the internal space may be in communication with the outside. Also, one inner surface of the housing 110 may be provided with an outer wall 110b protruding to correspond to an outer diameter of the piezoelectric element 140, and the piezoelectric element 140 may be inserted into and fixed to an inner surface of the outer wall 110b, such that the piezoelectric element 140 may be more firmly coupled to one inner surface of the housing 110.

The second elastic member 170 may be coupled to one end of the diaphragm 820 coupled to the seat portion 836 to elastically support the mass body 830, and the first and second elastic members 150 and 170 may have a natural vibration frequency coinciding with that of the piezoelectric element 140.

Figure 22:
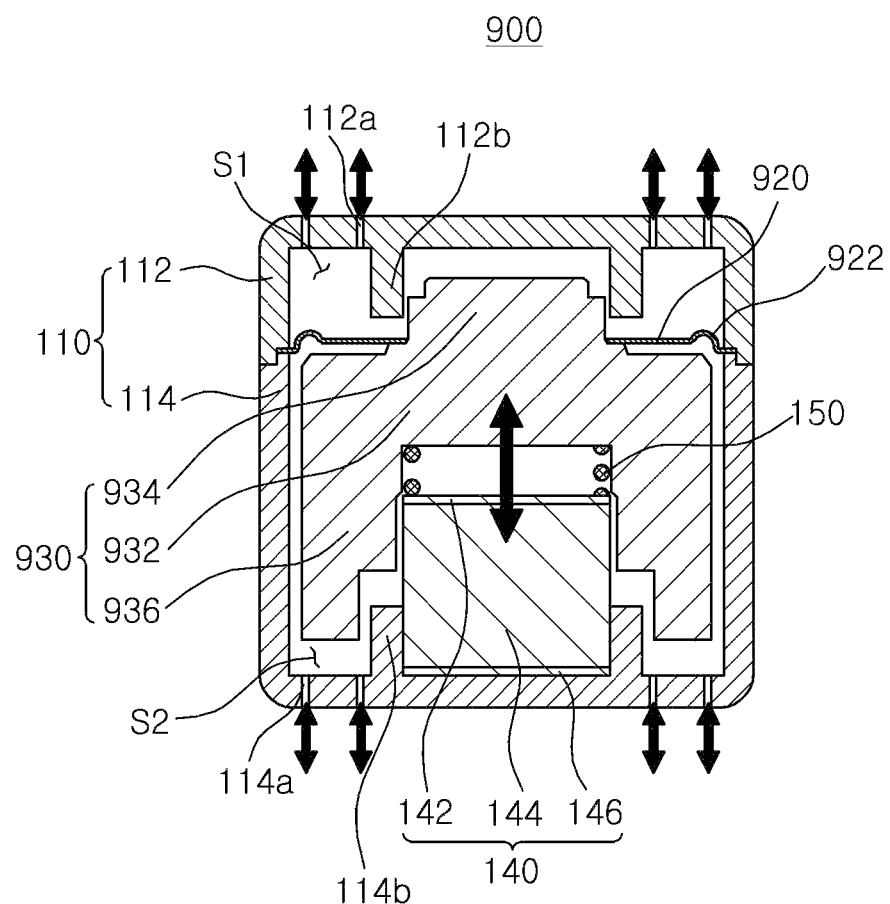
FIG. 22 is a schematic cross-sectional view showing a vibration actuator according to a ninth embodiment of the present invention.
Figure 23:
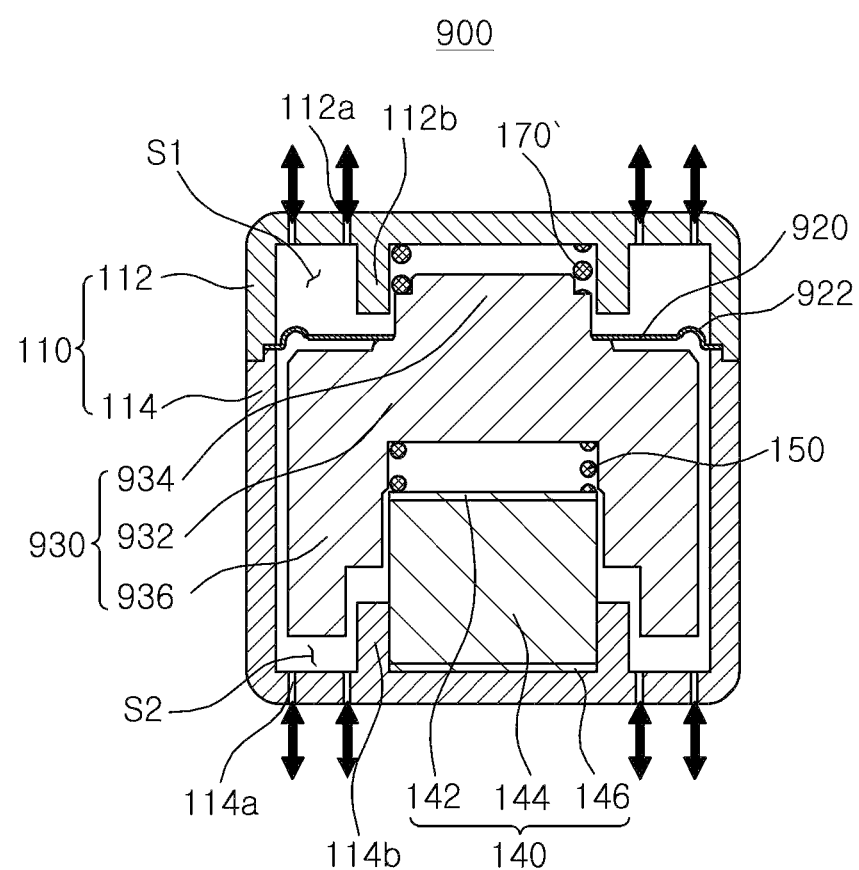
FIG. 23 is a schematic cross-sectional view showing a form in which the vibration actuator according to the ninth embodiment of the present invention further includes a second elastic member.

FIG. 22 is a schematic cross-sectional view showing a vibration actuator according to a ninth embodiment of the present invention; and FIG. 23 is a schematic cross-sectional view showing a form in which the vibration actuator according to the ninth embodiment of the present invention further includes a second elastic member.

Referring to FIGS. 22 and 23, a vibration actuator 900 according to the ninth embodiment of the present invention is the same as the vibration actuator 300 according to the third embodiment of the present invention except for the first and second elastic members 150 and 170. Therefore, a description of components other than the first and second elastic members 150 and 170 will be omitted.

The mass body 930 may include horizontal portion 932, a protrusion portion 934 protruding upwardly from a central portion of the horizontal portion 932, and an avoidance portion 936 extending downwardly from an outer side of the horizontal portion 932. Here, a diaphragm 920 may have one end coupled to the horizontal portion 932 of the mass body 930 and the other end coupled to the housing 110 to separate an internal space of the housing 110 together with the mass body 930. In addition, the diaphragm 920 includes at least one bent portion 922 formed in one surface thereof and having a hemispherical shape, such that it may further improve elastic force of the diaphragm 920. In addition, the first elastic member 150 may be disposed between the mass body 930 and the piezoelectric element 140 to transfer vibratory force transferred from the piezoelectric element 140 to the mass body 930, thereby allowing the mass body 930 to vibrate.

In addition, referring to FIG. 23, the second elastic member 170 may be disposed between a protrusion portion 934 of the mass body 930 and the housing 110.

More specifically, the second elastic member 170 may be disposed at an inner side of the projection portion 112b of the housing 110 in the inner radial direction.

Figure 24:
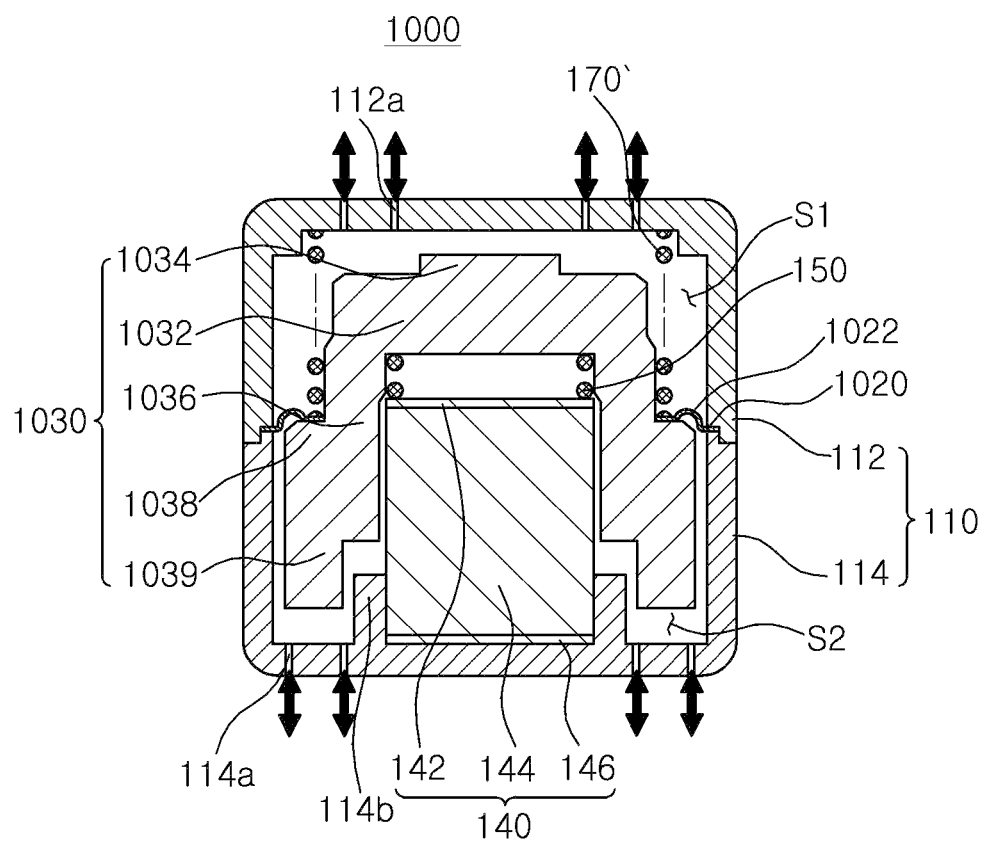
FIG. 24 is a schematic cross-sectional view showing a vibration actuator according to a tenth embodiment of the present invention.
Figure 25:
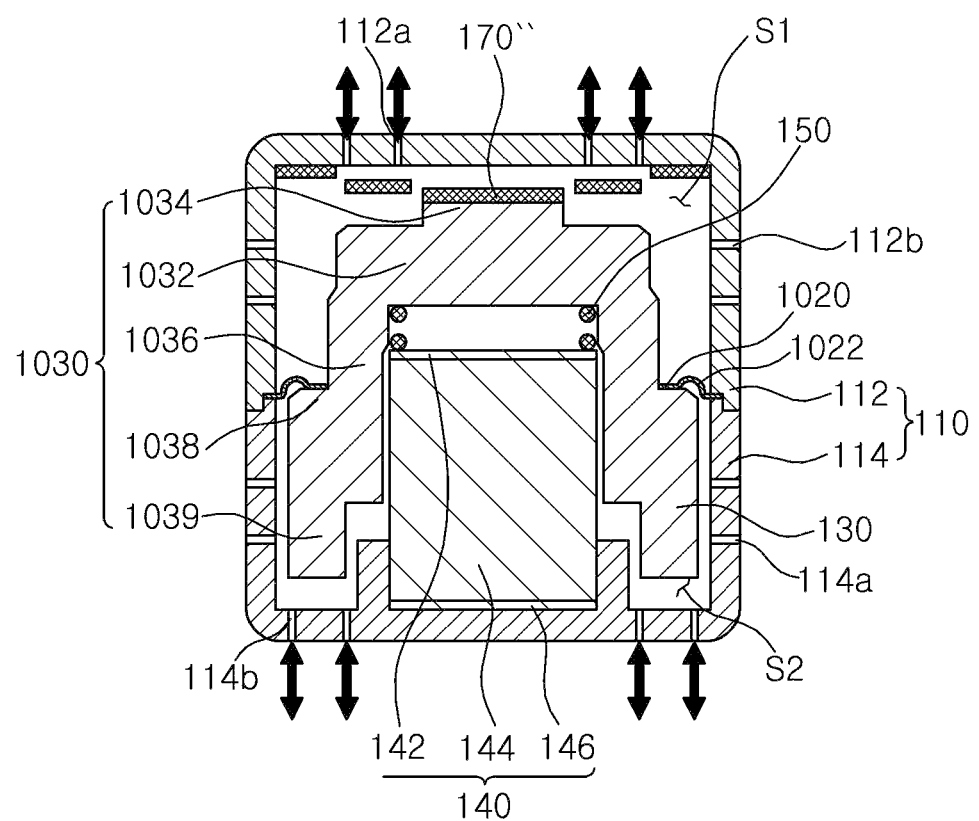
FIG. 25 is a schematic cross-sectional view showing a modified example of a second elastic member of the vibration actuator according to the tenth embodiment of the present invention.

FIG. 24 is a schematic cross-sectional view showing a vibration actuator according to a tenth embodiment of the present invention; and FIG. 25 is a schematic cross-sectional view showing a modified example of a second elastic member of the vibration actuator according to the tenth embodiment of the present invention.

Referring to FIGS. 24 and 25, a vibration actuator 1000 according to the tenth embodiment of the present invention is the same as the vibration actuator 400 according to the fourth embodiment of the present invention except for the first and second elastic members 150 and 170. Therefore, a description of components other than the first and second elastic members 150 and 170 will be omitted.

The mass body 1030 may include a horizontal portion 1032, a protrusion portion 1034 protruding upwardly from a central portion of the horizontal portion 1032, an avoidance portion 1036 extended downwardly from an outer side of the horizontal portion 1032, a seat portion 1038 extended from the avoidance portion 1036 in the outer radial direction, and an extension portion 1039 extended downwardly from the seat portion 1038. Here, the diaphragm 1020 may have one end coupled to the seat portion 1038 of the mass body 1030 and the other end coupled to the housing 110 to separate an internal space of the housing 110 together with the mass body 1030. In addition, the diaphragm 1020 includes at least one bent portion 1022 formed in one surface thereof and having a hemispherical shape, such that it may further improve elastic force of the diaphragm 1020. In addition, the first elastic member 150 may be disposed between a mass body 1030 and the piezoelectric element 140 to transfer vibratory force from the piezoelectric element 140 to the mass body 1030, thereby allowing the mass body 1030 to vibrate.

In addition, referring to FIG. 25, the second elastic member 170 may be disposed between a protrusion portion 1034 of the mass body 1030 and the housing 110 and elastically support the mass body 1030 together with the first elastic member 150.

As set forth above, with the vibration actuator according to the embodiments of the present invention, a demand for miniaturization and slimness in a portable electronic device may be satisfied, a vibration amount may be increased, and power consumption may be reduced.

In addition, heat generated in a process of driving the vibration actuator may be cooled by a cooling system included in the vibration actuator according to the embodiments of the present invention.

While the present invention has been shown and described in connection with the embodiments, it will be apparent to those skilled in the art that modifications and variations can be made without departing from the spirit and scope of the invention as defined by the appended claims.

What is claimed is:

1. A vibration actuator comprising:
   a housing providing an internal space and including holes formed to allow the internal space to be in communication with the outside;
   a diaphragm disposed to separate the internal space into first and second chambers;
   a mass body coupled to the diaphragm; and
   a piezoelectric element coupled to one inner surface of the housing and disposed under the mass body.

2. The vibration actuator of claim 1, wherein the mass body is disposed in the second chamber.

3. The vibration actuator of claim 1, wherein the holes are formed in the housing such that each of the first and second chambers is in communication with ambient air surrounding the housing.

4. The vibration actuator of claim 1, wherein the diaphragm includes at least one bent portion formed in one surface thereof and having a hemispherical shape.

5. The vibration actuator of claim 1, wherein the diaphragm has elastic force.

6. The vibration actuator of claim 1, wherein in the piezoelectric element, a single piezoelectric film is used.

7. The vibration actuator of claim 1, wherein in the piezoelectric element, a plurality of piezoelectric films are used.

8. The vibration actuator of claim 1, wherein one inner surface of the housing is provided with an outer wall protruding to correspond to an outer diameter of the piezoelectric element.

9. The vibration actuator of claim 1, wherein the mass body includes a protrusion portion formed by protruding at least a portion of an upper surface thereof upwardly, the protrusion portion being coupled to the diaphragm.

10. The vibration actuator of claim 1, further comprising a support portion disposed between the housing and the diaphragm and elastically supporting the mass body coupled to the diaphragm.

11. The vibration actuator of claim 1, further comprising a first elastic member disposed between the piezoelectric element and the mass body,
    wherein the piezoelectric element is disposed to be spaced apart from the mass body by a predetermined interval.

12. The vibration actuator of claim 11, further comprising a support portion disposed between the housing and the diaphragm and elastically supporting the mass body coupled to the diaphragm.

13. A vibration actuator comprising:
    a housing providing an internal space and including holes formed to allow the internal space to be in communication with the outside;
    a piezoelectric element coupled to one inner surface of the housing;
    a mass body disposed on an upper portion of the piezoelectric element; and
    a diaphragm having one end coupled to the mass body and the other end coupled to the housing to separate the internal space into first and second chambers together with the mass body.

14. The vibration actuator of claim 13, wherein the mass body includes a horizontal portion, a protrusion portion protruding upwardly from a central portion of the horizontal portion, and an avoidance portion extended downwardly from an outer side of the horizontal portion.

15. The vibration actuator of claim 14, wherein the diaphragm has one end coupled to the horizontal portion.

16. The vibration actuator of claim 13, wherein one inner surface of the housing is provided with an outer wall protruding to correspond to an outer diameter of the piezoelectric element.

17. The vibration actuator of claim 14, wherein the other inner surface of the housing is provided with a projection portion protruding to have an inner diameter larger than an outer diameter of the protrusion portion.

18. The vibration actuator of claim 13, wherein the mass body includes a horizontal portion, a protrusion portion protruding upwardly from a central portion of the horizontal portion, an avoidance portion extended downwardly from an outer side of the horizontal portion, a seat portion extended from the avoidance portion in an outer radial direction, and an extension portion extended downwardly from the seat portion.

19. The vibration actuator of claim 18, wherein the diaphragm has one end coupled to the seat portion.

20. The vibration actuator of claim 18, further comprising a second elastic member having one end coupled to the housing and the other end coupled to the seat portion to elastically support the mass body.

21. The vibration actuator of claim 18, further comprising a second elastic member having one end coupled to the housing and the other end coupled to the protrusion portion to elastically support the mass body.

22. The vibration actuator of claim 13, wherein the mass body includes a horizontal portion, a vertical portion extended from an outer side of the horizontal portion in a vertical direction, and a seat portion formed to be bent from a lower portion of the vertical portion in an outer radial direction.

23. The vibration actuator of claim 22, wherein the diaphragm has one end coupled to the seat portion.

24. The vibration actuator of claim 23, further comprising a support portion disposed between the housing and the horizontal portion and elastically supporting the mass body.

25. The vibration actuator of claim 23, further comprising a second elastic member having one end coupled to the housing and the other end coupled to the seat portion to elastically support the mass body.

26. The vibration actuator of claim 23, wherein the other inner surface of the housing is provided with a projection portion corresponding to an outer diameter of the support portion, and the support portion is inserted into and fixed to an inner portion of the projection portion and the horizontal portion.

27. The vibration actuator of claim 13, wherein the mass body includes a horizontal portion, an avoidance portion extended downwardly from an outer side of the horizontal portion, a seat portion formed to be bent from the avoidance portion in an outer radial direction, and an extension portion extended downwardly from the seat portion.

28. The vibration actuator of claim 27, further comprising a support portion disposed between the housing and the horizontal portion and elastically supporting the mass body.

29. The vibration actuator of claim 28, wherein the other inner surface of the housing is provided with a projection portion corresponding to an outer diameter of the support portion, and the support portion is inserted into and fixed to an inner portion of the projection portion.

30. The vibration actuator of claim 13, further comprising a first elastic member disposed between the piezoelectric element and the mass body,
    wherein the piezoelectric element is disposed to be spaced apart from the mass body by a predetermined interval.

31. The vibration actuator of claim 30, wherein the mass body includes a horizontal portion, an avoidance portion formed to be bent downwardly from an outer side of the horizontal portion, and a seat portion bent from the avoidance portion in an outer radial direction.

32. The vibration actuator of claim 31, further comprising a second elastic member having one end coupled to the housing and the other end coupled to the seat portion to elastically support the mass body.

* * * * *